United States Patent [19] [11] 4,277,412
Logan [45] Jul. 7, 1981

[54] FRACTIONATION OF TRIGLYCERIDE MIXTURES

[75] Inventor: Ted J. Logan, Cincinnati, Ohio

[73] Assignee: The Proctor & Gamble Company, Cincinnati, Ohio

[21] Appl. No.: 108,985

[22] Filed: Jan. 2, 1980

[51] Int. Cl.$^3$ .................................................. C09F 5/10
[52] U.S. Cl. .................................. 260/428.5; 560/191
[58] Field of Search ..................... 260/428.5; 560/218, 560/191

[56] References Cited

U.S. PATENT DOCUMENTS

| | | | |
|---|---|---|---|
| 852,441 | 5/1907 | Lockwood | 260/428.5 |
| 2,197,861 | 4/1940 | Hyman | 260/428.5 X |
| 2,288,441 | 6/1942 | Ewring | 260/428.5 X |
| 2,314,621 | 3/1943 | Kelley | 260/425 |
| 2,509,509 | 5/1950 | Leaders et al. | 260/428.5 |
| 2,577,079 | 12/1951 | Gee | 260/428.5 |
| 2,985,589 | 5/1961 | Broughton | 210/34 |
| 4,048,205 | 9/1977 | Neuzil | 260/428.5 X |
| 4,049,688 | 9/1977 | Neuzil | 260/428.5 X |
| 4,189,442 | 2/1980 | Lubsen et al. | 260/428.5 |
| 4,213,913 | 7/1980 | de Rosset | 260/428.5 |

FOREIGN PATENT DOCUMENTS

| | | | |
|---|---|---|---|
| 1476511 | 6/1977 | United Kingdom | 260/428.5 |

OTHER PUBLICATIONS

Leben, Wiss. Tech. vol. 10 No. 6 pp. 328–331 (Dallas et al.)
JAOCS vol. 42 Jan. 1965 pp. 9–14 (Jurriens et al.)
Derwent Abstract #60592B/33 Jul. 7, 1979
Lam et al., J. Chrom. Sci 15, pp. 234–238, Jul. 1977.
Breck D., *Zeolite Molecular Sieves,* New York (1974).
Chem. and Ind. 24, pp. 150–151 and pp. 1049–1050 (1962).
JAOCS 41, 403–406 Jun. 1964.

*Primary Examiner*—John F. Niebling
*Attorney, Agent, or Firm*—Ronald L. Hemingway; Richard C. Witte

[57] ABSTRACT

Triglyceride mixture is fractionated (on the basis of Iodine Value) utilizing selected permutite adsorbent and selected solvent(s).

16 Claims, No Drawings

FRACTIONATION OF TRIGLYCERIDE MIXTURES

TECHNICAL FIELD

The field of the invention is the separation of triglyceride mixture to obtain product(s) of Iodine Value different from that of said mixture.

The invention is useful, for example, to remove a particular undesirable lower Iodine Value fraction. A very important application of this is the treatment of oils with mostly unsaturated fatty acid moieties (e.g. sunflower oil) to reduce the content of triglyceride with fatty acid moiety having saturated carbon chain. This allows production of a salad or cooking oil with essentially zero percent saturates (by FDA nutritional standards).

The invention is also useful, for example, to remove an undesirable higher Iodine Value fraction from a feedstock. An important application of this is the processing of soybean oil to reduce the content of triglyceride with linolenic acid moiety to minimize the development of rancidity and odor and thereby obtain the benefits of touch hardening without the disadvantages of cis to trans isomerization, double bond position changes and need to remove catalyst and hydrogenation odor.

Other important applications of the invention are the recovery of increased trilinolein level composition from regular safflower oil and the recovery of increased triolein level composition from high oleic safflower oil.

The invention is also useful for obtaining particular Iodine Value cuts for any special purpose.

BACKGROUND ART

Logan et al U.S. patent application Ser. No. 043,394 filed May 25, 1979, now abandoned in favor of U.S. Pat. Ser. No. 134,029 filed Mar. 26, 1980, discloses the fractionation of triglyceride mixtures utilizing macroreticular strong acid cation exchange resin adsorbents. The invention herein differs, for example, in utilizing an adsorbent different from that used in Ser. No. 043,394 and advantageous over resin adsorbents from the standpoints of flexibility, cost, and of being inorganic rather than organic in nature.

It is known to remove various non-triglyceride impurities from triglyceride mixtures utilizing various aluminosilicate adsorbents. See, for example: U.S. Pat. Nos. 852,441; 2,288,441; 2,314,621; 2,509,509; 2,557,079. This kind of art discloses using aluminosilicates to decolorize, deodorize, treat used oil, refine, remove trace metals, remove catalyst and remove free fatty acid. The process herein differs, for example, in the feedstock which is essentially free of the type of impurities to which this body of prior art is addressed to removing.

It is known on an analytical scale to separate triglyceride mixtures utilizing silica gel treated with silver nitrate. See, for example, *Journal of the American Oil Chemists Society,* 41, pp. 403-406 (June 1964). The adsorbent there has the disadvantage of having a short life cycle in that the silver nitrate being not chemically attached is leached out. The adsorbent used herein has no such leaching problem.

U.S. Pat. No. 2,197,861 suggests the possibility of utilizing an aluminosilicate to cause polymerization in an animal, vegetable or marine oil whereby unpolymerized material is readily separated from polymerized material. Such a process would have the disadvantage of producing unuseful polymerized material. The process of the instant invention is carried out without significant polymerization occurring.

Neuzil et al U.S. Pat. No. 4,048,205 and Neuzil et al U.S. Pat. No. 4,049,688 and Logan et al U.S. Pat. No. 4,210,594 disclose the fractionation of alkyl fatty carboxylate mixtures using synthetic crystalline aluminosilicates (zeolites). These crystalline aluminosilicate adsorbents typically contain up to about 25% amorphous aluminosilicate, e.g., clay. The process of the invention herein differs, for example, in the feedstock. The process of the invention herein also differs in the adsorbent which is advantageous over the crystalline zeolite adsorbents from the standpoints of versatility (in that, with the adsorbent herein, the same equipment and packing is advantageously used for separation of alkyl carboxylates and triglycerides—this is not true for crystalline zeolites), flexibility (in that silicon to aluminum ratio and surface area are readily selected for the adsorbent herein—this is not true for crystalline zeolites), and dynamic capacity (in respect to selectively adsorbing triglyceride of higher Iodine Value).

Lam et al, "Silver Loaded Aluminosilicate As a Stationary Phase for the Liquid Chromatographic Separation of Unsaturated Compounds," *J. Chromatog. Sci.* 15 (7), 234-8 (1977) discloses the analytical (chromatographic) separation of bromophenacyl carboxylates on the basis of unsaturation utilizing silvered, surface aluminated silica gel adsorbents of microparticulate particle size (which particle size is not readily handled in a non-analytical commercial context and can result in significant loss due to suspension of particles in solvent). The process of the instant invention differs at least in the feedstock and in the adsorbent chemical structure and in the adsorbent particle size.

Breck, D. W., *Zeolite Molecular Sieves,* John Wiley & Sons, New York, 1974, pages 11-13 generally describes synthetic amorphous aluminosilicates (permutites) and uses thereof. The adsorbent herein is particular permutite as described in detail below.

BROAD DESCRIPTION OF THE INVENTION

It is an object of this invention to provide a process for fractionating triglyceride mixtures on the basis of Iodine Value utilizing an adsorbent which is made from low cost and readily available materials, which is readily provided with selected characteristics (ready choice in ratio of silicon atoms to aluminum atoms, surface area and cation substituents and level thereof), which is not subject to a cation leaching problem (as is silver nitrate treated silica gel), and which is advantageous over crystalline zeolite adsorbents from the standpoints of flexibility, versatility and dynamic capacity and which is advantageous over resin adsorbents from the standpoints of flexibility, dynamic capacity, cost, and of being inorganic in nature.

This object and other objects and advantages are readily obtained by the invention herein as described below.

The invention herein involves fractionating triglyceride mixture, on the basis of Iodine Value, utilizing selected solvent(s) and selected permutite adsorbent.

The feed (sometimes called feedstock) is a mixture of triglycerides with different Iodine Values (a mixture of triglyceride of higher Iodine Value with triglyceride of lower Iodine Value) which is to be separated to produce fractions of higher Iodine Value and lower Iodine Value. The triglycerides in the feed have carboxylic acid moieties which contain carbon chains containing from 6 to 26 carbon atoms. It is important that the feed is essentially free of impurities which can foul the adsorbent thereby causing loss of fractionating performance.

The feed is dissolved in particular solvent (the adsorption vehicle). The solution which is formed is contacted with particular permutite adsorbent. Triglyceride of higher Iodine Value is selectively adsorbed on such adsorbent, and a fraction of the mixture which is enriched (compared to the feed) in content of triglyceride of lower Iodine Value is left in solution in solvent.

Solution of the fraction which is enriched in content of triglyceride of lower Iodine Value is removed from contact with the adsorbent which has selectively adsorbed triglyceride of higher Iodine Value; this solution is denoted a raffinate. Fraction enriched in content of triglyceride of lower Iodine Value can readily be recovered from the raffinate as described later.

The adsorbent which has selectively adsorbed thereon triglyceride of higher Iodine Value is contacted with particular solvent (the desorbent) to cause desorption of adsorbed triglyceride and provide a solution in the solvent of fraction enriched (compared to the feed) in content of triglyceride of higher Iodine Value.

Solution in solvent of fraction enriched in content of triglyceride of higher Iodine Value is removed from contact with the adsorbent which has undergone desorption of triglyceride; this solution is denoted an extract. Fraction enriched in content of triglyceride of higher Iodine Value can be readily recovered from the extract as described later.

Preferred is a process where the solvent which is used to dissolve feed for selective adsorption (that is, the adsorption vehicle), and the solvent which is used as the vehicle for desorption (that is, the desorbent) have the same composition. Such process is conveniently referred to herein as a one solvent process. Preferably, such one solvent process is carried out continuously utilizing a simulated moving bed unit operation.

Less preferred is a process where the solvent which is used as the dissolving phase during adsorption and the solvent which is used as the vehicle for desorption have different compositions. This process is conveniently referred to herein as a two solvent process.

In general, the solvent(s) utilized herein (whether in a one solvent process or in a two solvent process) is (are) characterized by a solubility parameter (on a 25° C. basis) ranging from about 7.0 to about 15.0, a solubility parameter dispersion component (on a 25° C. basis) ranging from about 7.0 to about 9.0, a solubility parameter polar component (on a 25° C. basis) ranging from 0 to about 6.0 and a solubility parameter hydrogen bonding component (on a 25° C. basis) ranging from 0 to about 11.5.

The permutite adsorbent for the process herein is a synthetic amorphous aluminosilicate cation exchange material. It is homogeneous with respect to silicon atoms and aluminum atoms. Aluminum atoms are distributed essentially uniformly through the adsorbent structure and are considered to be essentially completely in the form of aluminate moieties.

The adsorbent is characterized by a ratio of silicon atoms to aluminum atoms (total atoms basis) ranging from about 3:1 to about 20:1 and a surface area (on a 100% sodium substitution basis) of at least about 100 square meters per gram.

The adsorbent has cation substituents selected from the group consisting of cation substituents capable of forming $\pi$ complexes and cation substituents not capable of forming $\pi$ complexes and combinations of these.

The adsorbent is used in the fractionating process herein in the form of particles which (on a bulk water free and solvent free basis) are substantially completely permutite adsorbent and which have a size ranging from about 200 mesh to about 20 mesh and which have a water content less than about 10% by weight.

The adsorbent is formed by reaction of aluminate ion and silicate ion in an aqueous medium; then, if necessary, adjusting the cation content (e.g. by providing a selected level of cation substituents capable of forming $\pi$ complexes); and adjusting the water content. Particle size can also be adjusted.

The solvent(s) (that is, the adsorption vehicle and the desorbent, whether in a one solvent process or a two solvent process), the ratio of silicon atoms to aluminum atoms in the adsorbent, and the level of cation substituents capable of forming $\pi$ complexes (which level can range from none at all up to 100% of exchange capacity) are selected to provide selectivity during adsorption and satisfactory desorption of adsorbed triglyceride.

Processing is carried out without significant polymerization of triglyceride occurring.

The invention herein contemplates one stage processing as well as processing in a plurality of stages. One stage processing is suitable for separating a mixture into two fractions. Multistage processing is suitable for separating a mixture into more than two fractions.

As used herein, the term "selectively" in the phrase "selectively adsorb" describes the ability of the adsorbent to preferentially adsorb a component or components. In practice, the component(s) which is (are) preferentially adsorbed, is (are) rarely ever the only component(s) adsorbed. For example, if the feed contains one part of a first component and one part of a second component, and 0.8 parts of the first component and 0.2 parts of the second component are adsorbed, the first component is selectively adsorbed.

The magnitude of the selective adsorption is expressed herein in terms of relative selectivity, that is, the ratio of two components in the adsorbed phase (extract) divided by the ratio of the same two components in the unadsorbed phase (raffinate). In other words, relative selectivity as used herein is defined by the following equation:

$$\text{Selectivity} = \frac{[\text{Concentration } M/\text{Concentration } N]_A}{[\text{Concentration } M/\text{Concentration } N]_U}$$

where M and N are two components of the feed represented in volume of weight percent and the subscripts A and U represent the adsorbed and unadsorbed phases respectively. When the selectivity is 1.0, there is no preferential adsorption of one component over the other. A selectivity larger than 1.0 indicates preferential adsorption of component M; in other words, the extract phase is enriched in M and the raffinate phase is enriched in N. The farther removed the selectivity is from 1.0, the more complete the separation.

The amount selectively adsorbed per unit volume of adsorbent in a batch equilibrium test (mixing of feed dissolved in solvent with adsorbent for up to one hour or until no further change in the chemical composition of the liquid phase occurs) is the static capacity of the adsorbent. An advantage in static capacity indicates a potential advantage in dynamic capacity. Dynamic capacity is the production rate in continuous operation in apparatus of predetermined size to obtain predetermined purity product(s).

The meaning of the terms "triglyceride of higher Iodine Value" and "trigylceride of lower Iodine Value" as used herein depends on the context of the application of the invention. The "triglyceride of higher Iodine Value" has to include the triglyceride of highest Iodine Value and can and often does consist of a plurality of triglycerides of different Iodine Values. The "triglyceride of lower Iodine Value" has to include the triglyceride of lowest Iodine Value (e.g. saturated triglyceride, i.e., triglyceride having all fatty acid moieties having saturated carbon chains, if such is present in the mixture being separated) and can and often does consist of a plurality of triglycerides of different Iodine Values. The important point is that the separation is one on the basis of Iodine Value.

The term "Iodine Value" is used in its normal meaning in relation to degree of unsaturation of fats and is described fully in Swern, *Bailey's Industrial Oil and Fat Products, Interscience,* 3rd edition, pages 63 and 64.

The composition of triglyceride mixtures is sometimes referred to herein as containing a percentage of particular fatty acid moiety "on a methyl ester basis" or "on a fatty methyl ester basis" or is defined "on a methyl ester basis" as containing percentages of methyl esters. Such percentages are obtained by determining the weight percentage of a particular methyl ester in the methyl ester mixture obtained by converting triglyceride fatty acid moieties into corresponding methyl esters. Thus, for example, a triglyceride mixture containing 7% linolenic acid moiety on a methyl ester basis means that the methyl ester mixture obtained on converting the fatty acid moieties of such triglyceride mixture contains by weight 7% methyl linolenate.

The term "solvent" as used herein refers both to solvent blends (i.e., solvents consisting of a plurality of constituents) and to pure compounds (i.e., solvents consisting of a single constituent) unless the context indicates otherwise.

The terms "solubility parameter," "solubility parameter dispersion component," "solubility parameter polar component" and "solubility parameter hydrogen bonding component" as used herein are defined by equations 6–10 at page 891 of Kirk-Othmer, *Encyclopedia of Chemical Technology,* 2nd edition, Supplement Volume, published by Interscience Publishers (John Wiley & Sons), New York, 1971. Values herein for solubility parameter, solubility parameter dispersion component solubility parameter polar component and solubility parameter hydrogen bonding component are for solvents at 25° C. (i.e., they are on a 25° c. basis). As on page 891, the symbols "$\delta$", "$\delta_D$", "$\delta_P$", and "$\delta_H$" are used herein to refer respectively to "solubility parameter," "solubility parameter dispersion component," "solubility parameter polar component" and "solubility parameter hydrogen bonding component". For many solvents the values for $\delta_D$, $\delta_P$, and $\delta_H$ are given in Table I which directly follows page 891 and the value for $\delta$ is calculated using equation (6) on page 891. For solvents consisting of a plurality of constituents, the value for "$\delta_D$," "$\delta_P$," and "$\delta_H$" are calculated by summing the corresponding values for the constituents multiplied by their volume fractions and the value for "$\delta$" is calculated using equation (6) on page 891.

Determination of the ratio of silicon atoms to aluminum atoms in the adsorbent is readily carried out, e.g., by elemental analysis for Si and Al and then calculating or by X-ray fluorescence together with comparison to a standard.

The surface area of the adsorbent is referred to as being on a 100% sodium substitution basis. This means that the surface area is measured on a sample of adsorbent with sodium substituents as all its cation substituents. Since permutite adsorbents are normally sold or initially prepared in the sodium form, surface areas on this basis are conveniently available. If the surface area was not measured on the sodium form prior to its being converted at least in part to some other form, the surface area (on a 100% sodium substitution basis) of an adsorbent which does not have sodium substituents as all its cation substituents is readily determined by converting a sample of such adsorbent to the sodium form and then measuring surface area. Surface area is measured by the B.E.T. nitrogen adsorption technique described in Brunauer, Emmitt and Teller, J. Am. Chem. Soc. 60, p. 309 (1938).

The term "cation substituents" means the exchangeable cations associated with the permutite adsorbent. The "cation substituents capable of forming $\pi$ complexes" are cation substituents capable of attracting and holding unsaturated materials (the greater the degree of unsaturation, the greater the attracting and holding power) by formation of a particular kind of chemisorption bonding known as $\pi$ bonding. The "cation substituents not capable of forming $\pi$ complexes" do not have significant ability to form such chemisorption bonds. The formation of $\pi$ complexes is considered to involve two kinds of bonding: (1) overlap between occupied $\pi$ molecular orbital of an unsaturate and an unoccupied d orbital or dsp-hybrid orbital of a metal and (2) overlap between the unoccupied antibonding $\pi^*$ molecular orbital of the unsaturate and one of the occupied metal d or dsp-hybrid orbitals (sometimes referred to as "back bonding"). This $\pi$ complexing is described, for example, in Chem. Revs. 68, pp. 785–806 (1968).

The level of silver substituents is referred to hereinafter in terms of millimoles/100 square meters of adsorbent surface area (on a 100% sodium substitution basis). This is determined by determining the amount of silver (e.g. by elemental microanalysis or utilizing X-ray fluorescence), by obtaining the surface area of the adsorbent on a 100% sodium substitution basis as described above and calculating.

The term "water content" as used herein means the water in the particles of adsorbent and consists of both the water of hydration and bulk water. The water of hydration is water chemically bonded in the permutite molecular structure (z in the empirical formula hereinafter). The bulk water is independent of the permutite chemical structure and occupies pores of the permutite. The water content of the adsorbent particles is readily measured by Karl Fischer titration or by determining weight loss on ignition at 400° C. for 2–4 hours. The water content values presented herein are percentages by weight.

DETAILED DESCRIPTION

The triglycerides in the feed have the formula

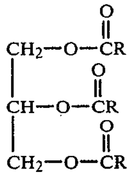

in which each R is aliphatic chain which contains 5 to 25 carbon atoms and is the same or different within a molecule. The aliphatic chains can be saturated or unsaturated. The unsaturated aliphatic chains are usually mono-, di- or triunsaturated.

The triglyceride mixtures for feed into a one stage process or into the first stage of a multistage process can be or are readily derived from naturally occurring fats and oils such as, for example, butter, corn oil, cottonseed oil, lard, linseed oil, olive oil, palm oil, palm kernel oil, peanut oil, rapeseed oil, safflower oil (both regular and high oleic), sardine oil, sesame oil, soybean oil, sunflower oil and tallow.

It is important that the triglyceride feedstock is essentially free of impurities such as gums, free fatty acids, mono- and diglycerides, color bodies, odor bodies, etc., which can foul (i.e. deactivate) the adsorbent thereby causing loss of fractionating performance. Such impurities are non-triglycerides which would be preferentially adsorbed and not desorbed thereby inactivating adsorption sites. The clean-up of the feedstock is accomplished by numerous techniques known in the art, such as alkali refining, bleaching with Fuller's Earth or other active adsorbents, vacuum-steam stripping to remove odor bodies, etc.

One very important feedstock is refined and bleached sunflower oil.

Another important feedstock is refined, bleached and deodorized soybean oil containing from about 6.5% to about 8.5% by weight of linolenic acid moiety on a fatty methyl ester basis and having an Iodine Value ranging from about 130 to about 150.

Still another important feedstock is refined, bleached and deodorized safflower oil (essentially free of wax and free fatty acids).

In a one solvent process, the feed is usually introduced into the adsorbing unit without solvent and is dissolved in solvent already in the unit, introduced, for example, in a previous cycle to cause desorption. If desired, however, the feed in a one solvent process can be dissolved in solvent prior to introduction into the adsorbing unit or the feed can be raffinate or extract from a previous stage comprising triglyceride mixture dissolved in solvent. In a two solvent process, the feed is preferably dissolved in the solvent constituting the vehicle for adsorption prior to introduction into the adsorbing unit.

Turning now to the solvents useful herein for a one solvent process (where the same solvent composition performs the dual role of being the dissolving phase during adsorption and the vehicle for desorption), these are preferably characterized by $\delta$ ranging from about 7.0 to about 10.5, $\delta_D$ ranging from about 7.0 to about 9.0 $\delta_P$ ranging from about 0.2 to about 5.1 and $\delta_H$ ranging from about 0.3 to about 7.4. More preferred solvents for use in a one solvent process herein are characterized by $\delta$ ranging from about 7.4 to about 9.0, $\delta_D$ ranging from about 7.25 to about 8.0, $\delta_P$ ranging from about 0.5 to about 3.0 and $\delta_H$ ranging from about 0.7 to about 4.0.

One important group of solvents for a one solvent process includes those consisting essentially by volume of from 0% to about 90% $C_5$–$C_{10}$ saturated hydrocarbon (that is, saturated hydrocarbon with from 5 to 10 carbon atoms) and from 100% to about 10% carbonyl group containing compound selected from the group consisting of (a) ester having the formula

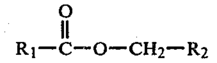

wherein $R_1$ is hydrogen or alkyl chain containing one or two carbon atoms and $R_2$ is hydrogen or alkyl chain containing one to three carbon atoms and (b) ketone having the formula

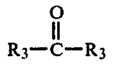

wherein each $R_3$ is the same or different and is alkyl chain containing 1 to 5 carbon atoms. Examples of suitable hydrocarbons are pentane, hexane, heptane octane, nonane, decane, isopentane and cyclohexane. Examples of esters suitable for use in or as the solvent are methyl formate, methyl acetate, ethyl acetate, methyl propionate, propyl formate and butyl formate. Examples of ketones suitable for use in or as the solvent are acetone, methyl ethyl ketone, methyl isobutyl ketone and diethyl ketone.

Another important group of solvents for a one solvent process are dialkyl ethers containing 1 to 3 carbon atoms in each alkyl group and blends of these with the hydrocarbon, ester and ketone solvents set forth above. Specific examples of solvents within this group are diethyl ether and diisopropyl ether.

Yet another important group of solvents for a one solvent process are blends of $C_{1\text{-}3}$ alcohols (e.g. from about 5% to about 40% by volume alcohol) with the hydrocarbon, ester and ketone solvents set forth above. Specific examples of solvents within this group are blends of methanol or ethanol with hexane.

Very preferably, the solvent for a one solvent process comprises ethyl acetate with blending with hexane being utilized to weaken the solvent and blending with ethanol being utilized to strengthen the solvent.

In most continuous one solvent processes envisioned within the scope of invention, the solvent is introduced into the process in a desorbing zone and sufficient solvent remains in the process to perform at a downstream location the dissolving function for adsorption.

The solvent to feed ratio for a one solvent process generally ranges on a volume basis from about 4:1 to about 100:1 and preferably ranges from about 5:1 to about 40:1.

We turn now to the solvents useful herein for a two solvent process (where different solvent compositions are used as the dissolving phase during adsorption and as the vehicle for desorption).

For a two solvent process herein, the solvents for use as the dissolving phase during adsorption, i.e., as the adsorption vehicle, are preferably characterized by $\delta$ ranging from about 7.3 to about 14.9, $\delta_D$ ranging from about 7.3 to about 9.0, $\delta_P$ ranging from 0 to about 5.7 and $\delta_H$ ranging from 0 to about 11.0. More preferred solvents for the adsorption vehicle for a two solvent process herein are characterized by $\delta$ ranging from about 7.3 to about 9.0, $\delta_D$ ranging from about 7.3 to about 8.0, $\delta_P$ ranging from 0 to about 2.7 and $\delta_H$ ranging from 0 to about 3.6. Very preferably, the solvent for the adsorption vehicle in a two solvent process herein is hexane or a blend consisting essentially of hexane and up to about 15% by volume ethyl acetate or diisopropyl ether.

For a two solvent process herein, the solvents for use as the vehicle for desorption, i.e., as the desorbent, are preferably characterized by $\delta$ ranging from about 7.4 to about 15.0 and at least 0.1 greater than the $\delta$ of the adsorption vehicle, $\delta_D$ ranging from about 7.3 to about 9.0, $\delta_P$ ranging from about 0.3 to about 6.0 and at least 0.3 greater than the $\delta_P$ of the adsorption vehicle, and $\delta_H$ ranging from about 0.5 to about 11.5 and at least 0.5 greater than the $\delta_H$ of the adsorption vehicle. More preferred solvents for the desorbent for a two solvent process herein are characterized by a $\delta$ ranging from about 7.4 to about 10.0, $\delta_D$ ranging from about 7.3 to about 8.0, $\delta_P$ ranging from about 0.5 to about 4.0 and $\delta_H$ ranging from about 0.5 to about 6.0 and having $\delta$, $\delta_P$ and $\delta_H$, respectively, greater than the $\delta$, $\delta_P$ and $\delta_H$ of the adsorption vehicle by at least the amounts stated above. Important desorbents for use in a two solvent process herein include: ethyl acetate; blends consisting essentially of ethyl acetate and up to about 80% by volume hexane; blends consisting essentially of ethyl acetate and up to about 25% by volume methanol or ethanol; and diisopropyl ether. Very preferably, the solvent for the desorbent in a two solvent process herein comprises ethyl acetate.

It is preferred in both a one solvent process herein and in a two solvent process herein to avoid use of halogenated hydrocarbon solvents as these shorten adsorbent life.

We turn now in detail to the adsorbent for use herein. It is defined the same regardless of whether it is used in a one solvent process or in a two solvent process.

The permutite adsorbents for use herein can be represented by the following empirical formula:

$$M_a.x(AlO_2).y(SiO_2).zH_2O$$

wherein "M" represents the cation substituents, "a" represents the provision of cation substituents to provide electrostatic neutrality, "y/x" is the ratio of silicon atoms to aluminum atoms; and "z" represents the water of hydration and can be zero or approach zero.

The permutite adsorbents herein are characterized by infra-red spectra with bands in the 1300–200 $cm^{-1}$ wavelength region characteristic of aluminosilicates including the strong Si-O, Al-O asymmetric stretch in the 1250–950 $cm^{-1}$ region, the symmetric Si-O, Al-O stretch at 720–650 $cm^{-1}$ and the 500–420 $cm^{-1}$ T-O bend (where T is a tetrahedral Si or Al), The infra-red spectra are characterized by the absence of bands associated with crystallinity. The adsorbents herein are characterized by X-ray diffraction readings showing no bands attributable to the adsorbents.

We turn now to the ratio of silicon atoms to aluminum atoms specified for the adsorbent herein. The lower limit of about 3:1 is related to the chemical structure of the adsorbents herein; in such structure, aluminate moiety is associated with three silicon atoms. The upper limit of about 20:1 has been selected to provide sufficient adsorbing power to obtain selectivity in some fractionation envisioned. In most instances in the important applications of the instant invention, the adsorbent preferably is characterized by a ratio (total atoms basis) of silicon atoms to aluminum atoms ranging from about 3:1 to about 6:1.

The characterization of the adsorbent in terms of surface area is important to obtaining appropriate capacity. If permutite adsorbent is utilized with a surface area (on a 100% substitution basis) less than the aforestated lower limit of about 100 square meters per gram, both static and dynamic capacity become quite low. Preferably, the adsorbent has a surface area (on a 100% sodium substitution basis) of at least about 200 square meters per gram. Permutites are known with surface areas (on a 100% sodium substitution basis) approaching as much as 600 square meters per gram.

We turn now to the cation substituents of the adsorbent.

The cation substituents capable of forming $\pi$ complexes are preferably selected from the group consisting of silver (in a valence state of 1), copper (in a valence state of 1), platinum (in a valence state of 2), palladium (in a valence state of 2) and combinations of these.

The cation substituents not capable of forming $\pi$ complexes are preferably selected from the group consisting of cation substituents from Groups IA and IIA of the Periodic Table and zinc cation substituents and combinations of these and very preferably are selected from the group consisting of sodium, potassium, barium, calcium, magnesium and zinc substituents and combinations of these.

Most preferably, the adsorbent has cation substituents selected from the group consisting of silver substituents in a valence state of one and sodium substituents and combinations of these.

Preferably, cation substituents such as hydrogen, which cause deterioration of the adsorbent structure (e.g. by stripping aluminum therefrom) should be avoided or kept at a minimum.

Fractionations are envisioned herein utilizing adsorbent with no cation substituents capable of forming $\pi$ complexes (e.g. together with a weak solvent as the adsorption vehicle). Such adsorbent functions by a physical adsorption mechanism to preferentially adsorb triglyceride of higher Iodine Value. Preferably, however, the adsorbent utilized has cation substituents capable of forming $\pi$ complexes as at least some of its cation substituents; these adsorbents function by a combination of physical adsorption and the type of chemical adsorption known as $\pi$ complexing to preferentially adsorb triglyercide of higher Iodine Value.

Very preferably, the adsorbent has a level of silver substituents greater than about 0.2 millimoles/100 square meters of adsorbent surface area (on a 100% sodium substitution basis). The upper limit on silver is found in a fully silver exchanged adsorbent with a ratio of silicon atoms to aluminum atoms of about 3:1 and is approximately 1.2 millimoles/100 square meters of adsorbent surface area (on a 100% sodium substitution basis). Most preferably, the adsorbent has a silver level ranging from about 0.4 millimoles/100 square meters of adsorbent surface area (on a 100% sodium substitution basis) to about 1.0 millimoles/100 square meters of adsorbent surface area (on a 100% sodium substitution basis).

The ratio of silicon atoms to aluminum atoms and the level of cation substituents capable of forming $\pi$ complexes interrelate, and the selection of these governs adsorbing power and therefore selectivity. These also have an effect on static and dynamic capacity.

The ratio of silicon atoms to aluminum atoms selected sets the maximum amount of cation substituents capable of forming $\pi$ complexes that can be introduced. This is because the cation substituents are held by negative charges associated with aluminum atoms in anionic moieties with a monovalent cation substituent being held by the charge associated with a single aluminum atom and a divalent cation substituent being held by the charges associated with two aluminum atoms. In practice, it is preferable to attempt to obtain a level of cation substituents capable of forming $\pi$ complexes by setting the ratio of silicon atoms to aluminum atoms and then attempting to introduce cation substituents capable of forming $\pi$ complexes as all of the cation substituents (100% of the exchange capacity).

With the adsorbent surface area held constant, and with the level of cation substituents capable of forming $\pi$ complexes being held at the same percentage of exchange capacity, as the ratio of silicon atoms to aluminum atoms is increased, the adsorbing power and capacity (static and dynamic) decreases. With the adsorbent surface area held constant and with the ratio of silicon atoms to aluminum atoms held constant, increasing the level of cation substituents capable of forming $\pi$ complexes results in increasing adsorbing power and capacity (static and dynamic). With the ratio of silicon atoms to aluminum atoms held constant and the level of cation substituents capable of forming $\pi$ complexes held constant, using adsorbent of increased surface area increases capacity (static and dynamic).

As is indicated above, the adsorbents herein are used in the form of particles which (on a bulk water free and solvent free basis) are substantially completely permutite and contain other constituents only in concentrations of parts per million.

The adsorbents herein generally have particle sizes ranging from about 200 mesh to about 20 mesh (U.S. Sieve Series). Use of a particle size less than about 200 mesh provides handling problems and can result in loss of adsorbent as a result of very small particles forming a stable suspension in solvent. Use of a particle size greater than about 20 mesh results in poor mass transfer. For a continuous process, particle sizes of about 80 mesh to about 30 mesh (U.S. Sieve Series) are preferred; using particle sizes larger than about 30 mesh reduces resolution and causes diffusion (mass transfer) limitations and using particle sizes less than about 80 mesh results in high pressure drops. Preferably, there is narrow particle size distribution within the aforestated ranges to provide good flow properties.

The water content is important in the adsorbent because too much water causes the adsorbent to be oleophobic (water occupies pores of the adsorbent preventing feed from reaching solid surface of the adsorbent). The less the water content is, the greater the adsorbing power and capacity. The upper limit of about 10% by weight water content has been selected so that the adsorbent will perform with at least mediocre efficiency. Preferably, the water content in the adsorbent is less than about 4% by weight.

Adsorbent in the sodium form is available commercially. For example, permutite in the sodium form is available from Diamond Shamrock (Polymers) Limited of Middlesex, England under the tradenames Zerolit Y, Zerolit S1240, Zerolit SPG1, Zerolit SPG2 and Decalso Y.

Permutites in the sodium form are readily prepared by first mixing sodium aluminate and sodium silicate in water to form a homogeneous solution and, second, neutralizing that alkaline solution with a strong mineral acid such as sulfuric acid to form a neutral solution, then allowing that solution to gel, letting the gel set until it becomes firm, then drying the gel, then breaking it up to produce particles. The ratio of silicon atoms to aluminum atoms is regulated by regulating the weight ratio of raw materials, sodium aluminate and sodium silicate.

Other methods of producing permutites are set forth in Breck which is referred to above.

Exchange to provide selected cation substituents is carried out by methods well known in the cation exchange art. When silver is the cation substituent to be introduced, the exchange is carried out in aqueous medium (for example, using a reaction time of 2–4 hours at ambient conditions). Suitable sources of silver include silver nitrate which is preferred and silver fluoride, silver chlorate and silver perchlorate. An excess of cation over the level desired to be introduced (e.g. 105% of stoichiometric) is desirably utilized. Unreacted cation is readily washed from the product. It is preferred to attempt to obtain total exchange.

The water content of the adsorbent is readily adjusted with conventional drying methods. For example, drying is readily carried out using vacuum or an oven (e.g. a forced draft oven). Drying is carried out to obtain the desired water content, e.g. by drying at a temperature of 100° C.–110° C. for 15–20 hours.

The particle size of the adsorbent is readily adjusted by sieving and/or size reduction. This preferably is carried out prior to cation exchange.

Turning now to the instant fractionation process, the selection of solvent(s), ratio of silicon atoms to aluminum atoms in the adsorbent and level of cation substituents capable of forming $\pi$ complexes are interrelated and depend on the separation desired to be obtained. The lower the ratio of silicon atoms to aluminum atoms in the adsorbent is, the greater the adsorbing power is. The higher the level of cation substituents capable of forming $\pi$ complexes is, the greater the adsorbing power and the greater the resistance to desorption. The lower the solubility parameter and solubility parameter polar and hydrogen bonding components of the solvent utilized as the dissolving phase during adsorption are, the more adsorbing power a particular adsorbent is able to exert. The higher the solubility parameter and the solubility parameter polar and hydrogen bonding components of the solvent utilized as the vehicle for desorption are, the more the desorbing power. The higher the degree of unsaturation (and Iodine Value) of the fraction desired to be separated is, the higher the solubility parameter and solubility parameter polar and hydrogen bonding components of the solvent that can be used for adsorbing and that is required for desorbing and the higher the ratio of silicon atoms to aluminum atoms and the lower the level of cation substituents capable of forming $\pi$ complexes in the adsorbent that can be used for adsorbing and which will allow desorbing.

When a particular adsorbent has been selected, the solvent used during adsorbing should have a solubility parameter and solubility parameter components sufficiently low to obtain selectivity, and the solvent used for desorbing should have a solubility parameter and solubility parameter components sufficiently high to obtain desorption.

When a particular solvent or particular solvents has (have) been selected, an adsorbent is selected with a ratio of silicon atoms to aluminum atoms sufficiently low and a level of cation substituents capable of forming $\pi$ complexes sufficiently high to provide desired selectivity during adsorption and with a ratio of silicon atoms to aluminum atoms sufficiently high and a level of cation substituents capable of forming $\pi$ complexes sufficiently low to allow desorption of all or desired portion of adsorbed triglyceride during the desorbing step.

We turn now to the conditions of temperature and pressure for the instant fractionation process. The temperatures utilized during adsorbing and during desorbing generally range from about 15° C. to about 200° C. A preferred temperature range to be used when the feed is a mixture of triglycerides having fatty acid moieties with aliphatic chains having from 12 to 20 carbon atoms is 50° to 80° C. and temperatures as low as about 40° C. may provide an advantage especially when triunsaturated moiety is present. The pressures utilized during adsorbing and desorbing can be the same and generally are those pressure encountered in packed bed processing, e.g., ranging from atmospheric (14.7 psia) to about 500 psia. For a simulated moving bed process as described hereafter, the pressures utilized preferably range from about 30 psia to about 120 psia or are as prescribed by the desired flow rate.

For a batch process, sufficient residence time should be provided to obtain appropriate yields and purities, usually 15 minutes to 20 hours. The rates for continuous processing are a function of the size of the equipment, the resolving ability of the adsorbent-solvent pair, and the desired yield and purity.

The fractionation process herein as described above provides a "raffinate" and an "extract." The raffinate contains fraction which is enriched in content of triglyceride of lower Iodine Value. It comprises triglyceride which was weakly attracted by the adsorbent, dissolved in solvent. The extract contains fraction enriched in content of triglyceride of higher Iodine Value. It comprises triglyceride which was more strongly attracted by the adsorbent, dissolved in solvent. The fractions of triglyceride can be recovered from the raffinate and from the extract by conventional separation processes such as by stripping solvent with heat, vacuum and/or steam.

We turn now to apparatus for a one solvent process herein and its operation.

For batch processing, the one solvent process herein is readily carried out in equipment conventionally used for adsorptions carried out batchwise. For example, such processing can be carried out utilizing a column containing adsorbent and alternately (a) introducing feed dissolved in solvent to obtain selective adsorption and (b) introducing solvent to obtain desorption to adsorbed fraction.

For continuous processing, the one solvent process herein is readily carried out in conventional continuous adsorbing apparatus and is preferably carried out by means of a simulated moving bed unit operation. A simulated moving bed unit operation and apparatus for such useful herein is described in Broughton et al U.S. Pat. No. 2,985,589.

For a simulated moving bed embodiment of this invention, preferred apparatus includes: (a) at least four columns connected in series, each containing a bed of adsorbent; (b) liquid access lines communicating with an inlet line to the first column, with an outlet line from the last column and with the connecting lines between successive columns; (c) a recirculation loop including a variable speed pump, to provide communication between the outlet line from the last column and the inlet line to the first column; and (d) means to regulate what flows in or out of each liquid access line.

Such preferred simulated moving bed apparatus is operated so that liquid flow is in one direction and so that countercurrent flow of adsorbent is simulated by manipulation of what goes into and out of the liquid access lines. In one embodiment, the apparatus is operated so that four functional zones are in operation. The first of the functional zones is usually referred to as the adsorption zone. This zone is downstream of a feed inflow and upstream of a raffinate outflow. In the adsorption zone, there is a net and selective adsorption of triglyceride of higher Iodine Value and a net desorption of solvent and of triglyceride of lower Iodine Value. The second of the functional zones is usually referred to as the purification zone. It is downstream of an extract outflow and upstream of the feed inflow and just upstream of the adsorption zone. In the purification zone, triglyceride of higher Iodine Value which has previously been desorbed is preferentially adsorbed and there is a net desorption of solvent and of triglyceride of lower Iodine Value. The third of the functional zones is referred to as the desorption zone. It is downstream of a solvent inflow and upstream of the extract outflow and just upstream of the purification zone. In the desorption zone, there is a net desorption of triglyceride of higher Iodine Value and a net adsorption of solvent. The fourth functional zone is usually referred to as the buffer zone. It is downstream of the raffinate outflow and upstream of the solvent inflow and just upstream of the desorption zone. In the buffer zone, triglyceride of lower Iodine Value is adsorbed and solvent is desorbed. The various liquid access lines are utilized to provide the feed inflow between the purification and adsorption zones, the raffinate outflow between the adsorption and buffer zones, the solvent inflow between the buffer and desorption zones and the extract outflow between the desorption and purification zones. The liquid flow is manipulated at predetermined time periods and the speed of the pump in the recirculation loop is varied concurrent with such manipulation so that the inlet points (for feed and solvent) and the outlet points (for raffinate and extract) are moved one position in the direction of liquid flow (in a downstream direction) thereby moving the aforedescribed zones in the direction of liquid flow and simulating countercurrent flow of adsorbent.

In another embodiment of simulated moving bed operation, a plurality of successive desorption zones is utilized (in place of a single desorption zone) with solvent being introduced at the upstream end of each desorption zone and extract being taken off at the downstream end of each desorption zone. It may be advantageous to use different solvent inlet temperatures and/or different solvents for different desorption zones.

In another embodiment of simulated moving bed operation, raffinate is taken off at a plurality of locations along the adsorption zone.

Less preferred continuous simulated moving bed apparatus than described above is the same as the apparatus described above except that the recirculation loop is omitted. The buffer zone can also be omitted.

In the operation of the above described simulated moving bed processes, the relative number of columns in each zone to optimize a process can be selected based on selectivities and resolution revealed by pulse testing coupled with capacity and purity requirements. A factor in selecting the number of columns in the adsorption zone is the percentage of the feed to be adsorbed. The purity of the extract and raffinate streams is a function of the number of columns in the adsorption zone. The longer the adsorption zone is (the more columns in it), that is, the further removed the feed inlet is from the raffinate outlet, the purer the raffinate is.

In the operation of the above described simulated moving bed processes, the time interval between manipulations of liquid flow should be sufficient to allow a substantial proportion of triglyceride of higher Iodine Value to stay in the adsorption zone and a substantial proportion of triglyceride of lower Iodine Value to leave.

We turn now to apparatus for the two solvent process herein and its operation.

Such two solvent process is preferably carried out using a column loaded with adsorbent. The feed and the solvent constituting the adsorption vehicle are run through the column until a desired amount of feed is adsorbed. Then, the desorbing solvent is run through the column to remove adsorbed material.

Such two solvent process is less preferably carried out, for example, in a batch mixing tank containing the adsorbent. The feed together with solvent constituting the absorption vehicle is added into the tank. Then mixing is carried out until a desired amount of adsorption occurs. Then liquid is drained. Then desorbing solvent is added and mixing is carried out until the desired amount of desorption occurs. Then solvent containing the desorbed triglyceride is drained.

We turn now in more detail to the important process referred to earlier involving sunflower oil. The feed is refined and bleached sunflower oil; it contains from about 9% to about 12% by weight saturated fatty acid moiety (palmitic acid moiety and stearic acid moiety) on a methyl ester basis. The adsorbent for this process is that generally described above. Preferably, the adsorbent is one characterized by a ratio of silicon atoms to aluminum atoms ranging from about 3:1 to about 6:1, a surface area (on a 100% sodium substitution basis) of at least about 200 square meters per gram, a level of silver substituents ranging from about 0.4 millimoles/100 square meters of adsorbent surface (on a 100% sodium substitution basis) to about 1.0 millimoles/100 square meters of adsorbent surface area (on a 100% sodium substitution basis) with any remainder of cation substituents being sodium substituents, and a particle water content less than about 4% by weight. The temperature used during adsorbing and during desorbing preferably ranges from about 50° C. to about 80° C. The processing is preferably carried out continuously in a one solvent process in a simulated moving bed unit operation as described above utilizing a pressure ranging from about 30 psia to about 120 psia or as prescribed by the desired flow rate. The solvent for a one solvent process is that generally described above for a one solvent process and preferably consists essentially by volume of from 0% to about 20% hexane and from 100% to about 80% ethyl acetate. The extract obtained contains triglyceride mixture containing less than about 3.5% by weight saturated fatty acid moiety on a fatty methyl ester basis. Product recovered from the extract is suitable for a salad or cooking oil.

We turn now in more detail to the important process referred to earlier involving soybean oil feed. As indicated earlier the feed is soybean oil (refined, bleached and deodorized soybean oil) containing from about 6.5% to about 8.5% by weight linolenic acid moiety (on a fatty methyl ester basis) and having an Iodine Value ranging from about 130 to 150. The adsorbent for this process is that generally described above. Preferably, the adsorbent is one characterized by a ratio of silicon atoms to aluminum atoms ranging from about 3:1 to about 6:1, a surface area (on a 100% sodium substitution basis) of at least about 200 square meters per gram, a level of silver substituents ranging from about 0.4 millimoles/100 square meters of adsorbent surface area (on a 100% sodium substitution basis) to about 1.0 millimoles/100 square meters of adsorbent surface area (on a 100% sodium substitution basis) with any remainder of cation substituents being sodium substituents and a particle water content less than about 4% by weight. The temperature used during adsorbing and during desorbing preferably ranges from about 50° C. to about 80° C. and temperatures as low as 40° C. can sometimes provide an advantage. The processing is preferably carried out continuously in a one solvent process in a simulated moving bed unit operation as described above utilizing a pressure ranging from about 30 psia to about 120 psia or as prescribed by the desired flow rate. The solvent for a one solvent process is that generally described above for a one solvent process and preferably is ethyl acetate or a blend of ethyl acetate and hexane. The raffinate obtained contains triglyceride mixture containing from 0% to about 5% linolenic acid moiety by weight on a fatty methyl ester basis and having an Iodine Value ranging from about 80 to about 125. Product recovered from the raffinate is competitive with touch hardened soybean oil in relation to rancidity and odor problems and avoids entirely the problems associated with touch hardening of processing to remove nickel catalyst and hydrogenation order and cis to trans isomerization and double bond position changes. In other words, the product obtained from the process of the invention contains no trans double bonds and no double bonds in positions different from those in the feedstock. Fraction obtained from extract is an excellent drying oil.

We turn now in more detail to the multistage processing referred to generally above.

Multistage processing can involve the following. The feedstock to be separated is processed in a first stage to obtain first extract containing fraction enriched (compared to the feedstock) in content of triglyceride of higher Iodine Value and first raffinate containing fraction enriched (compared to the feedstock) in content of triglyceride of lower Iodine Value and depleted (compared to the feedstock) in content of triglyceride of higher Iodine Value. The first raffinate or first extract, preferably the triglyceride fraction obtained by essentially completely removing solvent from first raffinate or first extract, is processed in the second stage to obtain second extract containing fraction enriched in content of triglyceride of higher Iodine Value (compared to the feed to the second stage) and second raffinate enriched (compared to the feed to the second stage) in content of triglyceride of lower Iodine Value and depleted (compared to the feed to the second stage) in content of triglyceride of higher Iodine Value. To the extent succeeding stages are used, each succeeding stage has as its feed raffinate or extract from the preceding stage, preferably triglyceride fraction obtained by essentially completely removing solvent from such.

We turn now to the advantages of the process herein. Significant advantages result from the chemical composition and structure of the adsorbent herein. Firstly, such adsorbent is made from materials which are readily commercially available in large amounts. Secondly, flexibility in adsorbent composition is readily provided in that permutite starting materials with different surface areas are readily available or prepared and in that a predetermined ratio of silicon atoms to aluminum atoms within the aforestated limits is readily obtained. Thirdly, level of cations capable of forming $\pi$ complexes can be readily regulated by selecting the ratio of silicon atoms to aluminum atoms.

Furthermore, there is no problem of cations capable of forming $\pi$ complexes (e.g. silver) being leached from the adsorbent as there is with silver nitrate treated silica gel adsorbent.

Furthermore, the adsorbent herein is advantageous over crystalline zeolite adsorbents from the standpoints of flexibility and dynamic capacity and is advantageous over resin adsorbents from the standpoints of flexibility, dynamic capacity, cost and of being inorganic in nature.

Furthermore, the process herein is carried out without the adsorbent handling and loss problems which can be associated with use of microparticulate particle size adsorbents.

The invention is illustrated in the following specific examples.

In Examples I and II below, "pulse tests" are run to determine the quality of separation that can be obtained in one solvent processing with selected adsorbents and solvents. The apparatus consists of a column having a length of 120 cm. and an inside diameter of 1 cm. and having inlet and outlet ports at its opposite ends. The adsorbent is dispersed in solvent and introduced into the column. The column is packed with about 100 cc. of adsorbent on a wet packed basis. The column is in a temperature controlled environment. A constant flow pump is used to pump liquid through the column at a predetermined flow rate. In the conducting of the tests, the adsorbent is allowed to come to equilibrium with the particular solvent and feed by passing a mixture of the solvent and feed through the column for a predetermined period of time. The adsorbent is then flushed with solvent until a 5 milliliter fraction contains a negligible amount of feed. At this time, a pulse of feed containing a known amount of docosane tracer is injected, via a sample coil, into the solvent inflow. The pulse of feed plus tracer is thereby caused to flow through the column with components first being adsorbed by the adsorbent and then caused to be desorbed by the solvent. Equal volume effluent samples are collected, and triglyceride therefrom is converted to methyl ester which is analyzed by gas chromatography. From these analyses, elution concentration curves for tracer, triglyceride components (in the case of Example I) and methyl esters derived from the triglyceride (in the case of Example II) are obtained—concentration in milligrams per milliliters is plotted on the y axis and elution volume in milliliters is plotted on the x axis. The distance from time zero (the time when the pulse of feed plus tracer is introduced) to the peak of a curve is the elution volume. The difference between the elution volume of a triglyceride component (Example I) or a methyl ester (Example II) and the elution volume of tracer is the retention volume for the triglyceride component or methyl ester. Relative selectivity is the ratio of retention volumes.

In Example III, pilot plant test apparatus (sometimes referred to as a demonstration unit) is utilized. The apparatus is operated according to the continuous simulated moving bed unit operation mentioned above to carry out a one solvent process. The apparatus comprises twenty-four columns which are connected in series in a loop to permit the process liquid to flow in one direction. Each column has a length of 24 inches and an inside diameter of 9/10 of an inch and is loaded with about 237 cc. of adsorbent (wet packed basis). Each column is equipped with two four-position valves (top and bottom) connected to four inlet and four outlet conduits. When a valve is closed, liquid flows only toward the column downstream of the valve. By selecting between the eight open positions (four at top and four at bottom), feed can be caused to be introduced to the system (e.g. position 1), solvent can be caused to be introduced to the system (e.g. position 2), a raffinate stream can be removed from the system (e.g. position 3), an extract stream can be removed from the system (e.g. position 4) or a solvent stream can be removed from the system (e.g. position 5). Backflow check positions are located in each of the bottom valves. These are used to isolate zones of the system from backflow; i.e., isolate the high pressure inlet (solvent) from the low pressure outlet. Operation is as follows: At any time, the apparatus constitutes a single stage. It is operated with four working zones (adsorption, purification, desorption, and buffer). One backflow control valve is always in closed position to eliminate backflow between the solvent inlet and the low pressure outlet. No recirculation is used. The twenty-four columns are apportioned between the adsorption, purification, desorption, and buffer zones with a selected number of columns in series comprising each zone. Feed is introduced into the first column of the adsorption zone and is dissolved in solvent and is contacted with adsorbent. As liquid flows downstream through the adsorption zone, triglyceride component(s) of higher Iodine Value is (are) selectively adsorbed leaving raffinate enriched in triglyceride of lower Iodine Value. In the purification zone, non-adsorbed components are forced from the adsorbent and are thus forced downstream toward the feed point. The extract is removed at the inlet to the purification zone and is enriched in adsorbed components. The solvent is added at the inlet to the desorption zone and causes desorption of adsorbed component(s) from the adsorbent for removal downstream at the extract point. In the buffer zone, triglyceride is adsorbed and solvent is desorbed. A stream denoted herein as a solvent outlet stream and consisting mostly of solvent is taken off at the outlet from the buffer zone. At selected intervals a controller advances the flow pattern (into and out of columns) one column (in other words, the controller manipulates valves so that raffinate outflow, feed inflow, extract outflow, solvent inflow and solvent outflow points each advance one step, that is, to the next liquid access point in the direction of liquid flow) to "step forward" to keep pace with the liquid flow. A cycle consists of the number of steps equal to the number of columns. The "step time" is chosen such as to allow the non-adsorbed components to advance faster than the feed point and reach the raffinate point. The adsorbed triglyceride moves slower than the feed point and falls behind to the extract point.

In Example IV below, apparatus and operation are generally as described above for Example III except that 15 columns are used and no buffer zone is used and there is no solvent outlet stream.

In Example V below, a test is run to demonstrate selection of solvents for a two solvent process once a particular adsorbent has been selected. The apparatus utilized is the same as that utilized in the runs of Examples I and II and as in Examples I and II, the column is packed with about 100 cc. of adsorbent (wet packed basis). The following procedure is utilized. A plurality of solvents is utilized successively, each being of progressively increasing desorbing power. The initial solvent is pumped through the column at 2 ml/minute with the column temperature being 50° C. 2.0 gms of feed (0.1 gram docosane tracer and 1.9 grams triglyceride mixture) is dissolved in 10 ml. of the initial solvent. Flow through the column is stopped, and the 10 ml. of initial solvent with feed dissolved therein is injected into the column entrance. Flow of initial solvent is then restarted and effluent sample collection is begun. After approximately two column volumes of the initial solvent is pumped into the column, the solvent is changed and approximately two column volumes of the second solvent is pumped into the column. The solvent is successively changed after the two column volumes of a solvent is pumped until all the solvents being tested have been pumped into the column. Eluant samples are collected, and the triglyceride therefrom is converted to methyl ester which is analyzed by gas chromatography.

We turn now to the Examples I–V which are generally described above.

EXAMPLE I

Six series of runs are carried out.

A "pulse" of the same composition is used in every run of this example. Each "pulse" consists by volume of 50% solvent and 50% triglyceride plus tracer. The triglyceride plus tracer portion consists by weight of 45% triolein, 45% trilinolein and 10% docosane tracer. Each "pulse" is free of impurities which can foul adsorbent.

A different adsorbent is used in each series of runs. In each case, the adsorbent is in the form of particles which (on a bulk water free and solvent free basis) are substantially completely permutite adsorbent and which have a size ranging from about 40 mesh to about 20 mesh and which have a water content less than 4% by weight. In each case, the adsorbent is Decalso Y obtained from Diamond Shamrock (Polymers) Limited of Middlesex, England or is derived from Decalso Y. In each case, the adsorbent is characterized by a ratio of silicon atoms to aluminum atoms of 3:1 and a surface area (on a 100% sodium substitution basis) of 233 square meters per gram. In each run of Run Series I, the adsorbent has sodium substituents as 100% of its cation substituents. In each run of Run Series II, the adsorbent has a level of silver substituents of 0.2 millimoles/100 square meters of adsorbent surface area (on a 100% sodium substitution basis). In each run of Run Series III, the absorbent has a level of silver substituents of 0.4 millimoles/100 square meters of adsorbent surface area (on a 100% sodium substitution basis). In each run of Run Series IV, the adsorbent has a level of silver substituents of 0.6 millimoles/100 square meters of adsorbent surface area (on a 100% sodium substitution basis). In each run of Run Series V, the adsorbent has a level of silver substituents of 0.8 millimoles/100 square meters of adsorbent surface area (on a 100% sodium substitution basis). In each run of Run Series VI, the adsorbent has a level of silver substituents of approximately 1.0 millimoles/100 square meters of adsorbent surface area (on a 100% sodium substitution basis). The silver substituents are in a valence state of 1. The adsorbents in the runs of Run Series II–VI have sodium substituents as the remainder of their cation substituents. The silvered forms of the adsorbent are prepared by placing particles of Decalso Y (screened to through 20 mesh and on 40 mesh) in aqueous silver nitrate solution (105% of stoichiometric) for three hours and washing with water. The water content of the adsorbent for each run is adjusted by vacuum drying at 105° C.

In a Run Series, each run is carried out with a different solvent. The solvents are referred to in the tables below as solvents A, B, C, D, E and F. Solvent A consists by volume of 100% hexane ($\delta=7.30$, $\delta_D=7.30$, $\delta_P=0$, $\delta_H=0$). Solvent B consists by volume of 15% ethyl acetate and 85% hexane (for this solvent blend: $\delta=7.39$, $\delta_D=7.36$, $\delta_P=0.39$, $\delta_H=0.53$). Solvent C consists by volume of 25% ethyl acetate and 75% hexane (for this solvent blend: $\delta=7.47$, $\delta_D=7.39$, $\delta_P=0.65$, $\delta_H=0.88$). Solvent D consists by volume of 50% ethyl acetate and 50% hexane (for this solvent blend: $\delta=7.81$, $\delta_D=7.50$, $\delta_P=1.30$, $\delta_H=1.75$). Solvent E consists by volume of 75% ethyl acetate and 25% hexane (for this solvent blend: $\delta=8.28$, $\delta_D=7.60$, $\delta_P=1.95$, $\delta_H=2.63$). Solvent F consists by volume of 100% ethyl acetate ($\delta=8.85$, $\delta_D=7.70$, $\delta_P=2.60$, $\delta_H=3.50$).

Each run is carried out at 50° C.

Each run is carried out as follows: Solvent is pumped continuously through the column at a rate of 2 ml. per minute. At time zero, a sample pulse as described above of 1 ml. is added by means of a sample coil, into the solvent flow. The equal volume samples that are collected are each 5 ml.

The tables below present the results for each run. In the tables below: $M_3$ stands for triolein, $D_3$ stands for trilinolein, $\alpha$ stands for selectivity for $D_3/M_3$, and $\Delta V$ stands for the separation in ml. between peaks of the elution concentration curves for triolein and trilinolein. In the tables below, a dash under $M_3$ or $D_3$ indicates that such component does not appear in the eluant.

| | | Retention Volumes (ml.) | | | |
|---|---|---|---|---|---|
| Run # | Solvent | $M_3$ | $D_3$ | $\alpha$ | $\Delta V$ |
| | | RUN SERIES I | | | |
| 1 | A | — | — | — | — |
| 2 | B | 20 | 25 | 1.25 | 5 |
| 3 | C | 10 | 15 | 1.50 | 5 |
| 4 | D | 10 | 10 | 1.00 | 0 |
| | | RUN SERIES II | | | |
| 5 | B | 35 | 75 | 2.14 | 40 |
| 6 | C | 5 | 25 | 5.00 | 20 |
| 7 | D | 5 | 5 | 1.00 | 0 |
| | | RUN SERIES III | | | |
| 8 | B | 75 | — | — | — |
| 9 | C | 20 | 65 | 3.25 | 45 |
| 10 | D | 0 | 10 | ∞ | 10 |
| 11 | E | 0 | 5 | ∞ | 5 |
| 12 | F | 0 | 5 | ∞ | 5 |
| | | RUN SERIES IV | | | |
| 13 | E | 0 | 25 | ∞ | 25 |
| 14 | F | 0 | 20 | ∞ | 20 |

-continued

| Run # | Solvent | Retention Volumes (ml.) M3 | D3 | α | ΔV |
|---|---|---|---|---|---|
| | | RUN SERIES V | | | |
| 15 | E | 5 | 75 | 15 | 70 |
| 16 | F | 0 | 65 | ∞ | 65 |
| | | RUN SERIES VI | | | |
| 17 | C | — | — | — | — |
| 18 | D | 20 | — | — | — |
| 19 | E | 10 | — | — | — |
| 20 | F | 5 | 140 | 28 | 135 |

The above results indicate: separation on the basis of Iodine Value (i.e. to obtain fractions of higher and lower Iodine Value) is obtained at least in Runs 2, 3, 5, 6, 9-16 and 20; separation on the basis of Iodine Value is obtained with each adsorbent; weaker adsorbents require weaker solvents; between selectivities are obtained at silver levels of 0.4 millimoles/100 square meters of adsorbent surface area (on a 100% sodium substitution basis) and higher; the best yields are obtained at silver levels of 0.8 millimoles/100 square meters of adsorbent surface area (on a 100% sodium substitution basis) and higher utilizing 75-100% ethyl acetate/25-0% hexane as solvent.

The above data provides basis for selecting solvent and adsorbent to obtain a particular kind of separation.

EXAMPLE II

The feed (on a tracer free basis) is refined, bleached and deodorized safflower oil (essentially free of wax and free fatty acids) which, when converted to methyl ester mixture which is analyzed by gas chromatography gives the following composition on a weight basis: 7% methyl palmitate, 3% methyl stearate, 12% methyl oleate, 77% methyl linoleate and 1% other. It is essentially free of impurities which can foul the adsorbent.

The adsorbent for the test is in the form of particles which (on a bulk water free and solvent free basis) are substantially completely permutite adsorbent and which have a size ranging from about 40 mesh to about 20 mesh and which have a water content less than 4% by weight. The adsorbent is Zerolit SPG2 modified to contain a silver ($Ag^{+1}$) level of 0.8 millimoles/100 square meters of adsorbent surface area (on a 100% sodium substitution basis). The cation substituents in the adsorbent which are not silver substituents are sodium substituents. The Zerolit SPG2 is obtained from Diamond Shamrock (Polymers) Limited of Middlesex, England and is permutite characterized by a ratio of silicon atoms to aluminum atoms of 6:1 and a surface area (on a 100% sodium substitution basis) of 278 square meters per gram. The absorbent is prepared by placing particles of Zerolit SPG2 (screened to through 20 mesh and on 40 mesh) in aqueous silver nitrate solution (105% of stoichiometric) for three hours and washing with water and adjusting the water content by vacuum drying at 105° C.

The solvent for the test consists by volume of 50% hexane and 50% ethyl acetate. For this solvent blend: $\delta=7.81$, $\delta_D=7.50$, $\delta_P=1.30$, and $\delta_H=1.75$.

The test is run at 50° C.

During the test, solvent is pumped continuously through the column at a rate of 2 milliliters per minute. At time zero, a sample pulse of 1 milliliter, containing approximately 0.075 grams docosane (tracer) and 0.750 grams regular safflower oil (as described above) dissolved in solvent (50/50 hexane/ethyl acetate) is added by means of a sample coil, into the solvent flow. 5.0 milliliter equal volume fractions are collected. The triglyceride in each fraction is converted to methyl ester and the methyl ester is analyzed.

Retention volumes are obtained as follows: for methyl palmitate, 10 ml.; for methyl stearate, 10 ml.; for methyl oleate, 10 ml., for methyl linoleate, 20 ml.

The relative selectivities for methyl linoleate/methyl oleate and for methyl linoleate/methyl palmitate are each 2.0.

This data indicates separation on the basis of Iodine Value (i.e. to obtain fractions of higher and lower Iodine Value). This data also indicates that nearly pure trilinolein fractions can be collected.

EXAMPLE III

This example illustrates separation of triglycerides into an extract fraction containing a substantially reduced percentage of triglyceride with saturated fatty acid moiety and a raffinate fraction. The run is carried out utilizing continuous simulated moving bed processing in the demonstration unit as described above.

The feed composition is refined, bleached, deodorized sunflower oil pretreated to remove remaining impurities (e.g. free fatty acid, monoglycerides, diglycerides, traces of water) by dissolving in hexane and passing through a Florisil packed column. It contains by weight on a methyl ester basis 6.4% methyl palmitate, 4.4% methyl stearate, 17.3% methyl oleate and 71.9% methyl linoleate. The feed composition is essentially free of impurities.

The adsorbent is Decalso Y modified to contain approximately 1.0 millimoles of silver ($Ag^{+1}$)/100 square meters of adsorbent surface area (on a 100% sodium substitution basis). The cation substituents in the adsorbent which are not silver substituents are sodium substituents. The adsorbent is in the form of particles which (on a bulk water free and solvent free basis) are substantially completely permutite adsorbent and which have a size ranging from about 40 mesh to about 20 mesh and which have a water content less than 4% by weight. The adsorbent is characterized by a ratio of silicon atoms to aluminum atoms of 3:1 and a surface area on a 100% sodium substitution basis of 233 square meters per gram. The adsorbent is prepared by placing particles of Decalso Y (screened to through 20 mesh and on 40 mesh) in aqueous silver nitrate solution (105% of stoichiometric) for three hours and washing with water and adjusting the water content by oven drying at 130° C.

The solvent consists by volume of 90% ethyl acetate and 10% hexane. For this solvent blend: $\delta=8.61$, $\delta_D=7.66$, $\delta_P=2.34$, $\delta_H=3.15$.

The controller and the valves of the demonstration unit are set so that the adsorption zone includes six columns, the purification zone includes eight columns, the desorption zone includes eight columns and the buffer zone includes two columns.

The step time (the interval at which the flow pattern is advanced one column) is 10 minutes.

The feed rate is 1.0 ml. per minute. The solvent introduction rate is 41.6 ml. per minute. The extract flow rate is 19 ml. per minute. The raffinate flow rate is 13.5 ml. per minute. The solvent outlet flow rate (at the exit of the buffer zone) is 10.1 ml. per minute.

The temperature of operation is 50° C.

Separation is obtained on the basis of Iodine Value, i.e., to obtain fractions of higher Iodine Value and lower Iodine Value.

Triglyceride fraction in extract contains by weight (on a methyl ester basis) 0.54% methyl palmitate, 0% methyl stearate, 21.13% methyl oleate, and 78.33% methyl linoleate. The percentage of saturated fatty acid moiety (on a methyl ester basis) is reduced from 10.8% in the feed to 0.54% in the triglyceride fraction in the extract. The triglyceride fraction in the extract is suitable for a salad or cooking oil.

Triglyceride fraction in raffinate contains by weight (on a methyl ester basis) 6.86% methyl palmitate, 4.80% methyl stearate, 17.07% methyl oleate, and 71.27% methyl linoleate. The triglyceride fraction in the raffinate is suitable for use in a plastic shortening or can be used as feedstock for another stage to obtain more product with reduced saturate level or some other fraction.

The solvent outlet stream contains triglyceride fraction containing on a methyl ester basis 100% methyl linoleate.

Processing is carried out without any significant amount of polymerization.

There is no significant leaching of silver.

The adsorbent particle size does not result in any significant handling or loss problems.

When in the run of Example III, an equivalent amount of copper or platinum or palladium is substituted for the silver substituents of the adsorbent, results are obtained indicating attainment of fractionation according to Iodine Value.

When in the run of Example III, an equivalent amount of potassium, barium, calcium, magnesium or zinc substituents is substituted for the sodium substituents of the adsorbent, results are obtained indicating fractionation according to Iodine Value.

When a solvent consisting by volume of 35% hexane and 65% acetone (for this solvent blend: $\delta=8.49$, $\delta_D=7.50$, $\delta_P=3.32$, $\delta_H=2.21$) is substituted in Example III for the hexane/ethyl acetate solvent, fractionation on the basis of Iodine Value is obtained.

When a solvent consisting by volume of 15% diethyl ether and 85% ethyl acetate (for this solvent blend: $\delta=8.66$, $\delta_D=7.61$, $\delta_P=2.42$, $\delta_H=3.35$) is substituted in Example III for the hexane/ethyl acetate solvent, fractionation on the basis of Iodine Value is obtained.

When a solvent consisting by volume of 40% ethanol and 60% hexane (for this solvent blend: $\delta=8.54$, $\delta_D=7.46$, $\delta_P=1.72$, $\delta_H=3.80$) is substituted in Example III for the hexane/ethyl acetate solvent, fractionation on the basis of Iodine Value is attained.

When Amberlyst XN1010 (a macroreticular strong acid cation exchange resin sold by Rohm & Haas) with an equivalent amount of silver to that used in Example III is substituted for the adsorbent in the run of Example III, the fractionation obtained is less complete.

When Zeolite X or Zeolite Y or silvered Zeolite X or silvered Zeolite Y is substituted for the adsorbent in the run of Example III, essentially no fractionation on the basis of Iodine Value is obtained. This is due at least in part to inferior dynamic capacity.

EXAMPLE IV

This example illustrates separation of triglyceride mixture into raffinate fraction containing a reduced percentage of triglyceride with linolenic acid moiety and an extract fraction. The run of this example is carried out utilizing continuous simulated moving bed processing in the demonstration unit as described above.

The feed composition contains by weight on a methyl ester basis 39.4% methyl palmitate plus methyl stearate plus methyl oleate, 53.4% methyl linoleate, and 7.2% methyl linolenate. It is essentially free of impurities which can foul the adsorbent.

The adsorbent is the same as that used in Example II.

The solvent consists by volume of 70% hexane and 30% ethyl acetate. For this solvent blend: $\delta=7.53$, $\delta_D=7.42$, $\delta_P=0.80$, and $\delta_H=1.05$.

The controller and the valves of the demonstration unit are set so that the adsorption zone includes 5 columns, the purification zone includes 4 columns and the desorption zone includes 6 columns (total columns =15).

The step time (the interval at which the flow pattern is advanced one column) is 6.85 minutes.

The feed rate is 1.80 ml. per minute. The solvent introduction rate is 44.67 ml. per minute. The extract flow rate is 16.47 ml. per minute. The raffinate flow rate is 30.00 ml. per minute.

The temperature of operation is 50° C.

Raffinate and extract streams are recovered. Separation is obtained on the basis of Iodine Value, i.e., to obtain fractions of higher Iodine Value and of lower Iodine Value.

Triglyceride fraction in the raffinate contains by weight (on a methyl ester basis) 44.53% methyl palmitate plus methyl stearate plus methyl oleate, 55.47% methyl linoleate, and 0% methyl linolenate. The product obtained contains no trans double bonds and no double bonds in positions different from those in the feedstock. It is suitable for use as a liquid shortening.

Triglyceride fraction in the extract contains by weight (on a methyl ester basis) 2.29% methyl palmitate plus methyl stearate plus methyl oleate, 37.15% methyl linoleate and 60.56% methyl linolenate. It is suitable for use, for example, in a plastic shortening.

Processing is carried out without any significant amount of polymerization.

There is no significant leaching of silver. There is no fouling of the adsorbent with impurities.

The adsorbent particle size does not result in any significant handling or loss problems.

When Amberlyst XN1010 (a macroreticular strong acid cation exchange resin sold by Rohm & Haas) with an equivalent amount of silver to that used in Example IV is substituted for the adsorbent in Example IV, separation is less complete.

When Zeolite X or Zeolite Y or silvered Zeolite X or silvered Zeolite Y is substituted for the adsorbent in the run of Example IV, essentially no fractionation on the basis of Iodine Value is obtained. This is due at least in part to inferior dynamic capacity.

When refined, bleached and deodorized soybean oil (containing 6.54% linolenic acid moiety on a fatty methyl ester basis and having an Iodine Value of 139) is substituted as the feed in Example IV, triglyceride fraction in raffinate contains 0% linolenic acid moiety on a fatty methyl ester basis and has an Iodine Value of 119. The product obtained is suitable for use as a liquid shortening or salad or cooking oil; it contains no trans double bonds and no double bonds in positions different from those in the feedstock.

EXAMPLE V

The triglyceride mixture for fractionation contains by weight 15.78% trisaturated triglyceride (containing palmitic acid and stearic acid moieties), 42.11% triolein, and 42.11% trilinolein.

The adsorbent is the same as is used in Run Series V of Example I (Decalso Y modified to contain 0.8 millimoles silver/100 square meters of surface area on a 100% sodium substitution basis).

The solvent used first consists by volume of 95% hexane and 5% ethyl acetate (for this solvent blend: $\delta=7.33$, $\delta_D=7.32$, $\delta_P=0.13$, $\delta_H=0.18$); this solvent is denoted Solvent I below. The solvent used second consists by volume of 75% hexane and 25% ethyl acetate (for this solvent blend: $\delta=7.48$, $\delta_D=7.40$, $\delta_P=0.65$, $\delta_H=0.88$); this solvent is denoted Solvent II below. The solvent used third consists by volume of 50% hexane and 50% ethyl acetate (for this solvent blend: $\delta=7.81$, $\delta_D=7.50$, $\delta_P=1.30$, $\delta_H=1.75$); this solvent is denoted Solvent III below. The solvent used fourth consists by volume of 25% hexane and 75% ethyl acetate (for this solvent blend: $\delta=8.28$; $\delta_D=7.60$, $\delta_P=1.95$, $\delta_H=2.63$); this solvent is denoted Solvent IV below. The solvent used fifth consists by volume of 100% ethyl acetate ($\delta=8.85$, $\delta_D=7.70$, $\delta_P=2.60$, $\delta_H=3.50$); this solvent is denoted Solvent V below. The slvent used sixth consists by volume of 75% ethyl acetate and 25% methanol (for this solvent blend: $\delta=9.93$, $\delta_D=7.55$, $\delta_P=3.45$, $\delta_H=5.45$); this solvent is denoted Solvent VI below.

The test is carried out at 50° C.

Solvent I is pumped through the "pulse test" column described above at 5.0 ml./minute. With flow stopped, a "pulse" containing 2.0 grams (95% triglyceride mixture described above and 5% $C_{22}$ linear hydrocarbon tracer) dissolved in 10 ml. of Solvent I is injected into the column entrance. Flow of Solvent I is then restarted, and eluant sample collection begins. After approximately two column volumes of Solvent I are pumped, the solvent is changed to Solvent II, then to Solvent III, etc. with approximately two column volumes of each solvent being pumped in succession after the above described feed injection. Eluant samples are collected. Triglyceride mixture in each collected sample is converted to methyl ester which is analyzed by gas chromatography.

The table below presents the data for this run. In the table: "$S_3$" stands for trisaturated triglyceride, "$M_3$" stands for triolein, and "$D_3$" stands for trilinolein. The values given opposite each solvent represent the triglyceride composition eluted with that particular solvent. "IV" in the table below stands for the calculated Iodine Value of an eluted composition.

TABLE

| | SEPARATION OF TRIGLYCERIDE MIXTURE IN A TWO SOLVENT PROCESS | | | |
|---|---|---|---|---|
| Solvent | % $S_3$ | % $M_3$ | % $D_3$ | IV |
| I | 100 | — | — | 0 |
| II | 11.36 | 81.45 | 7.19 | 86.32 |
| III | 12.21 | 22.06 | 65.73 | 138.82 |
| IV | 0.26 | 14.46 | 85.28 | 167.37 |
| V | 0.00 | 0.19 | 99.81 | 180.82 |
| VI | 2.30 | 5.84 | 91.86 | 171.52 |

The above data indicates that with the selected adsorbent, to remove saturates ($S_3$) from unsaturates ($M_3$ and/or $D_3$), the solvent constituting the adsorption vehicle should be Solvent I and the solvent constituting the desorbent should be Solvent II when it is desired to recover monounsaturates ($M_3$) and Solvent IV when it is desired to recover diunsaturates ($D_3$) or monounsaturates plus diunsaturates ($M_3$ plus $D_3$). The data also indicates that with the selected adsorbent, to separate diunsaturates ($D_3$) from saturates plus monounsaturates ($S_3$ plus $M_3$), the solvent constituting the adsorption vehicle should be Solvent II and the solvent constituting the desorbent should be Solvent IV.

In the test of Example V, separation on the basis of Iodine Value is obtained, i.e., to produce fractions of higher Iodine Value and of lower Iodine Value.

Processing is carried out without any significant amount of polymerization.

There is no significant leaching of silver. There is no fouling of the adsorbent with impurities.

The adsorbent particle size does not result in any significant handling or loss problems.

Other solvents and blends can be substituted in the above example to provide similar results provided there is similarity of solubility parameters and solubility parameter components.

While the foregoing describes certain preferred embodiments of the invention, modifications will be readily apparent to those skilled in the art. Thus, the scope of the invention is intended to be defined by the following claims.

What is claimed is:

1. A process for separating a mixture of triglycerides with different Iodine Values and having their carboxylic acid moieties containing from 6 to 26 carbon atoms, to produce fractions of higher Iodine Value and lower Iodine Value, said process comprising the steps of (a) contacting a solution of said mixture in solvent with permutite absorbent to selectively adsorb triglyceride of higher Iodine Value and to leave in solution a fraction of said mixture enriched in content of triglyceride of lower Iodine Value, (b) removing solution of fraction enriched in content of triglyceride of lower Iodine Value from contact with adsorbent which has selectively adsorbed triglyceride of higher Iodine Value, (c) contacting adsorbent which has selectively adsorbed triglyceride of higher Iodine Value with solvent to cause desorption of adsorbed triglyceride and provide a solution in solvent of fraction enriched in content of triglyceride of higher Iodine Value, (d) removing solution of fraction enriched in content of triglyceride of higher Iodine Value from contact with adsorbent;

said mixture of triglycerides being essentially free of impurities which can foul the adsorbent; the solvent in step (a) and the solvent in step (c) having the same composition or different compositions and being characterized by a solubility parameter (on a 25° C. basis) ranging from about 7.0 to about 15.0, a solubility parameter dispersion component (on a 25° C. basis) ranging from about 7.0 to about 9.0, a solubility parameter polar component (on a 25° C. basis) ranging from 0 to about 6.0 and a solubility parameter hydrogen bonding component (on a 25° C. basis) ranging from 0 to about 11.5; said adsorbent being characterized by a ratio of silicon atoms to aluminum atoms ranging from about 3:1 to about 20:1 and a surface area (on a 100% sodium substitution basis) of at least about 100 square meters per gram; said adsorbent having cation substituents selected from the group consisting of cation substituents capable of forming $\pi$ complexes and cation substituents not capable of forming $\pi$ complexes and combinations of these; said adsorbent being in the form of particles which (on a bulk water free and solvent free basis) are substantially completely permutite adsorbent and which have a size ranging from about 200 mesh to about 20 mesh and which have a water content less than about 10% by weight; the solvent in step (a) and the solvent in step (c) and the ratio of silicon atoms to aluminum atoms in the adsorbent and the level of cation substituents capable of forming $\pi$ complexes being selected to provide selectivity in step (a) and desorption in step (c).

2. A process as recited in claim 1, in which the cation substituents capable of forming $\pi$ complexes are selected from the group consisting of silver, copper, platinum and palladium cation substituents and combinations of these, and in which the cation substituents not capable of forming $\pi$ complexes are selected from the group consisting of cation substituents from Group IA of the Periodic Table, cation substituents from Group IIA of the Periodic Table, zinc cation substituents and combinations of these.

3. A process as recited in claim 2, in which the adsorbent has cation substituents selected from the group consisting of silver substituents in a valence state of one and sodium substituents and combinations of these.

4. A process as recited in claim 3, in which the adsorbent has a level of silver substituents greater than about 0.2 millimoles/100 square meters of adsorbent surface area (on a 100% sodium substitution basis).

5. A process as recited in claim 4, in which the solvent in each step has the same composition and is characterized by a solubility parameter (on a 25° C. basis) ranging from about 7.0 to about 10.5, a solubility parameter dispersion component (on a 25° C. basis) ranging from about 7.0 to about 9.0, a solubility parameter polar component (on a 25° C. basis) ranging from about 0.2 to about 5.1, and a solubility parameter hydrogen bonding component (on a 25° C. basis) ranging from about 0.3 to about 7.4.

6. A process as recited in claim 5, in which the solvent is characterized by a solubility parameter (on a 25° C. basis) ranging from about 7.4 to about 9.0, a solubility parameter dispersion component (on a 25° C. basis) ranging from about 7.25 to about 8.0, a solubility parameter polar component (on a 25° C. basis) ranging from about 0.5 to about 3.0 and a solubility parameter hydrogen bonding component (on a 25° C. basis) ranging from about 0.7 to about 4.0.

7. A process as recited in claim 5 in which said solvent comprises ethyl acetate.

8. A process as recited in claim 5, in which said adsorbent is characterized by a ratio of silicon atoms to aluminum atoms ranging from about 3:1 to about 6:1, a surface area (on a 100% sodium substitution basis) of at least about 200 square meters per gram, a level of silver substituents ranging from about 0.4 millimoles/100 square meters of adsorbent surface area (on a 100% sodium substitution basis) to about 1.0 millimoles/100 square meters of adsorbent surface area (on a 100% sodium substitution basis), and a particle water content less than about 4% by weight.

9. A process as recited in claim 8, which is carried out by a continuous simulated moving bed technique.

10. A process as recited in claim 9, in which the mixture of triglycerides being separated is refined and bleached sunflower oil and in which fraction obtained in step (d) contains less than about 3.5% by weight saturated fatty acid moiety (on a fatty methyl ester basis).

11. A process as recited in claim 9, in which the mixture of triglycerides which is separated is refined, bleached and deodorized soybean oil containing from about 6.5% to about 8.5% by weight linolenic acid moiety (on a fatty methyl ester basis) and having an Iodine Value ranging from about 130 to about 150 and in which the fraction obtained in step (b) contains from 0% to about 5% by weight linolenic acid moiety (on a fatty methyl ester basis) and has an Iodine Value ranging from about 80 to about 125.

12. A process as recited in claim 4, in which the solvent in step (a), the adsorption vehicle, has a different composition from the solvent in step (c), the desorbent.

13. A process as recited in claim 12, in which the adsorption vehicle is characterized by a solubility parameter (on a 25° C. basis) ranging from about 7.3 to about 14.9, a solubility parameter dispersion component (on a 25° C. basis) ranging from about 7.3 to about 9.0, a solubility parameter polar component (on a 25° C. basis) ranging from 0 to about 5.7, and a solubility parameter hydrogen bonding component (on a 25° C. basis) ranging from 0 to about 11.0; in which the desorbent is characterized by a solubility parameter (on a 25° C. basis) ranging from about 7.4 to about 15.0 and at least 0.1 greater than that of the adsorption vehicle, a solubility parameter dispersion component (on a 25° C. basis) ranging from about 7.3 to about 9.0, a solubility parameter polar component (on a 25° C. basis) ranging from about 0.3 to about 6.0 and at least 0.3 greater than that of the adsorption vehicle, and a solubility parameter hydrogen bonding component (on a 25° C. basis) ranging from about 0.5 to about 11.5 and at least 0.5 greater than that of the adsorption vehicle.

14. A process as recited in claim 13, in which the adsorption vehicle is characterized by a solubility parameter (on a 25° C. basis) ranging from about 7.3 to about 9.0, a solubility parameter dispersion component (on a 25° C. basis) ranging from about 7.3 to about 8.0, a solubility parameter polar component (on a 25° C. basis) ranging from 0 to about 2.7, and a solubility parameter hydrogen bonding component (on a 25° C. basis) ranging from 0 to about 3.6; and in which the desorbent is characterized by a solubility parameter (on a 25° C. basis) ranging from about 7.4 to about 10.0, a solubility parameter dispersion component (on a 25° C. basis) ranging from about 7.3 to about 8.0, a solubility parameter polar component (on a 25° C. basis) ranging from about 0.5 to about 4.0 and a solubility parameter hydrogen bonding component (on a 25° C. basis) ranging from about 0.5 to about 6.0.

15. A process as recited in claim 14, in which the adsorption vehicle comprises hexane and in which the desorbent comprises ethyl acetate.

16. A process as recited in claim 13, in which said adsorbent is characterized by a ratio of silicon atoms to aluminum atoms ranging from about 3:1 to about 6:1, a surface area (on a 100% sodium substitution basis) of at least about 200 square meters per gram, a level of silver substituents ranging from about 0.4 millimoles/100 square meters of adsorbent surface area (on a 100% sodium substitution basis) to about 1.0 millimoles/100 square meters of adsorbent surface area (on a 100% sodium substitution basis), and a particle water content less than about 4% by weight.

* * * * *